(12) United States Patent
Cocchi et al.

(10) Patent No.: US 11,406,119 B2
(45) Date of Patent: Aug. 9, 2022

(54) METHOD AND MACHINE FOR MAKING SEMI-LIQUID FOOD PRODUCTS

(71) Applicant: ALI GROUP S.R.L.-CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.-CARPIGIANI, Cernusco Sul (IT)

(*) Notice: Subject to any disclaimer, the term of this patent is extended or adjusted under 35 U.S.C. 154(b) by 327 days.

(21) Appl. No.: 16/712,459

(22) Filed: Dec. 12, 2019

(65) Prior Publication Data
US 2020/0196627 A1   Jun. 25, 2020

(30) Foreign Application Priority Data
Dec. 21, 2018   (IT) .......................... 102018000020701

(51) Int. Cl.
*A23G 9/12* (2006.01)
*A23G 9/04* (2006.01)

(52) U.S. Cl.
CPC ............... *A23G 9/12* (2013.01); *A23G 9/045* (2013.01)

(58) Field of Classification Search
CPC ... A23G 9/00; A23G 9/12; A23G 9/04; A23G 9/045; A23G 9/08; A23G 9/106; A23G 9/14; A23G 9/16; A23G 9/166; A23G 9/28; A23G 9/283
See application file for complete search history.

(56) References Cited

U.S. PATENT DOCUMENTS

| | | | | |
|---|---|---|---|---|
| 2,698,163 A | * | 12/1954 | Swenson | A23G 9/20 366/153.1 |
| 3,327,615 A | * | 6/1967 | Swan | A47J 31/408 99/286 |
| 4,196,658 A | * | 4/1980 | Takagi | A47J 31/42 99/286 |
| 4,653,281 A | * | 3/1987 | Van Der Veer | A23G 9/045 366/144 |

(Continued)

FOREIGN PATENT DOCUMENTS

| | | |
|---|---|---|
| EP | 3058831 A1 | 8/2016 |
| EP | 3081093 A1 | 10/2016 |

(Continued)

OTHER PUBLICATIONS

Italian Search Report dated Jul. 15, 2019 from counterpart Italian Patent Application No. IT 102018000020701.

*Primary Examiner* — Miguel A Diaz
(74) *Attorney, Agent, or Firm* — Shuttleworth & Ingersoll, PLC; Timothy J. Klima

(57) ABSTRACT

A method for making semi-liquid iced food products includes the following steps: providing a container containing a liquid base product; opening the container containing a liquid base product; pouring only the contents of the container into a receptacle; transferring only the contents of the container, which have been poured into the receptacle, into a processing chamber provided with a stirrer and thermal treatment means; cooling with the thermal treatment means and simultaneously mixing with the stirrer, only the contents of the container which have been transferred into the processing chamber until obtaining a semi-liquid finished product.

15 Claims, 6 Drawing Sheets

(56) References Cited

U.S. PATENT DOCUMENTS

| | | | | |
|---|---|---|---|---|
| 5,158,506 A * | 10/1992 | Kusano | ............... | A23G 9/163 62/136 |
| 9,993,015 B2 * | 6/2018 | Geng | ............... | A23G 9/224 |
| 10,712,063 B2 * | 7/2020 | Cobabe | ............... | A23G 9/28 |
| 10,888,102 B2 * | 1/2021 | Tuchrelo | ............... | F25D 23/126 |
| 2005/0008754 A1 * | 1/2005 | Sweeney | ............... | A23C 9/1544 426/590 |
| 2008/0089983 A1 * | 4/2008 | Coste | ............... | A23G 9/32 426/106 |
| 2009/0053375 A1 * | 2/2009 | Johnson | ............... | A23G 9/04 426/474 |
| 2009/0117242 A1 * | 5/2009 | Kateman | ............... | A23G 9/12 426/474 |
| 2009/0120306 A1 * | 5/2009 | DeCarlo | ............... | A23G 9/224 99/485 |
| 2009/0217825 A1 * | 9/2009 | Cocchi | ............... | A23G 9/28 99/455 |
| 2012/0199608 A1 * | 8/2012 | Cocchi | ............... | A23G 9/225 222/146.6 |
| 2014/0178554 A1 * | 6/2014 | Bohn | ............... | A23G 9/40 426/565 |
| 2015/0034668 A1 * | 2/2015 | Minard | ............... | A23G 9/28 222/1 |
| 2015/0296831 A1 * | 10/2015 | Noth | ............... | A23G 9/12 141/11 |
| 2016/0229675 A1 * | 8/2016 | Popov | ............... | B67D 1/0021 |
| 2016/0366906 A1 * | 12/2016 | Geng | ............... | B01F 15/065 |
| 2017/0150844 A1 * | 6/2017 | Hesselbrock | ............... | A47J 31/407 |
| 2017/0215456 A1 * | 8/2017 | Noth | ............... | A23G 9/283 |
| 2017/0251696 A1 * | 9/2017 | Simons | ............... | A23G 9/52 |
| 2017/0319005 A1 * | 11/2017 | Freedman | ............... | A47J 31/06 |
| 2017/0332659 A1 * | 11/2017 | Cocchi | ............... | A23G 9/12 |
| 2018/0070760 A1 * | 3/2018 | Herbert | ............... | A23G 9/045 |
| 2018/0106515 A1 * | 4/2018 | Cobabe | ............... | A23G 9/224 |
| 2019/0216258 A1 * | 7/2019 | Freedman | ............... | A47J 31/56 |
| 2019/0335786 A1 * | 11/2019 | Cocchi | ............... | A23G 9/08 |

FOREIGN PATENT DOCUMENTS

| | | |
|---|---|---|
| EP | 3127431 A1 | 2/2017 |
| EP | 3158872 A1 | 4/2017 |
| EP | 3248468 A1 | 11/2017 |
| EP | 3269252 A1 | 1/2018 |
| EP | 3305091 A1 | 4/2018 |
| EP | 3391752 A1 | 10/2018 |

\* cited by examiner

METHOD AND MACHINE FOR MAKING SEMI-LIQUID FOOD PRODUCTS

This application claims priority to Italian Patent Application IT 102018000020701 filed Dec. 21, 2018, the entirety of which is incorporated by reference herein.

BACKGROUND OF THE INVENTION

This invention relates to a method and a machine for making semi-liquid food products.

In the field of iced food products, in particular in the ice cream trade, a need that is felt particularly strongly by shopkeepers is that for a method and a machine allowing a user to make ice creams with products purchased directly in the shop.

This need necessarily involves making small portions of ice cream, that is, single portions, with the base products used by the users.

SUMMARY OF THE INVENTION

This invention therefore has for an aim to provide a method and a machine for making semi-liquid iced products, capable of making an iced food product in reduced quantities—single portions, for example—based on the products chosen directly by the user.

A further aim of this invention, is to provide a method and a machine for making semi-liquid products in reduced quantities and which are simple to use and safe in terms of food hygiene.

A yet further aim of this invention is to provide a method and a machine for making semi-liquid products in reduced quantities and in a very limited space of time.

According to the invention, these aims are achieved by a method and a machine for making semi-liquid food products and comprising the technical features set out in one or more of the appended claims.

BRIEF DESCRIPTION OF THE DRAWINGS

The features of the invention, with reference to the above aims, are clearly described in the appended claims and its advantages are more apparent from the detailed description which follows, with reference to the accompanying drawings which illustrate preferred, non-limiting example embodiments of it. In particular:

DESCRIPTION OF THE PREFERRED EMBODIMENTS

Figure 1:
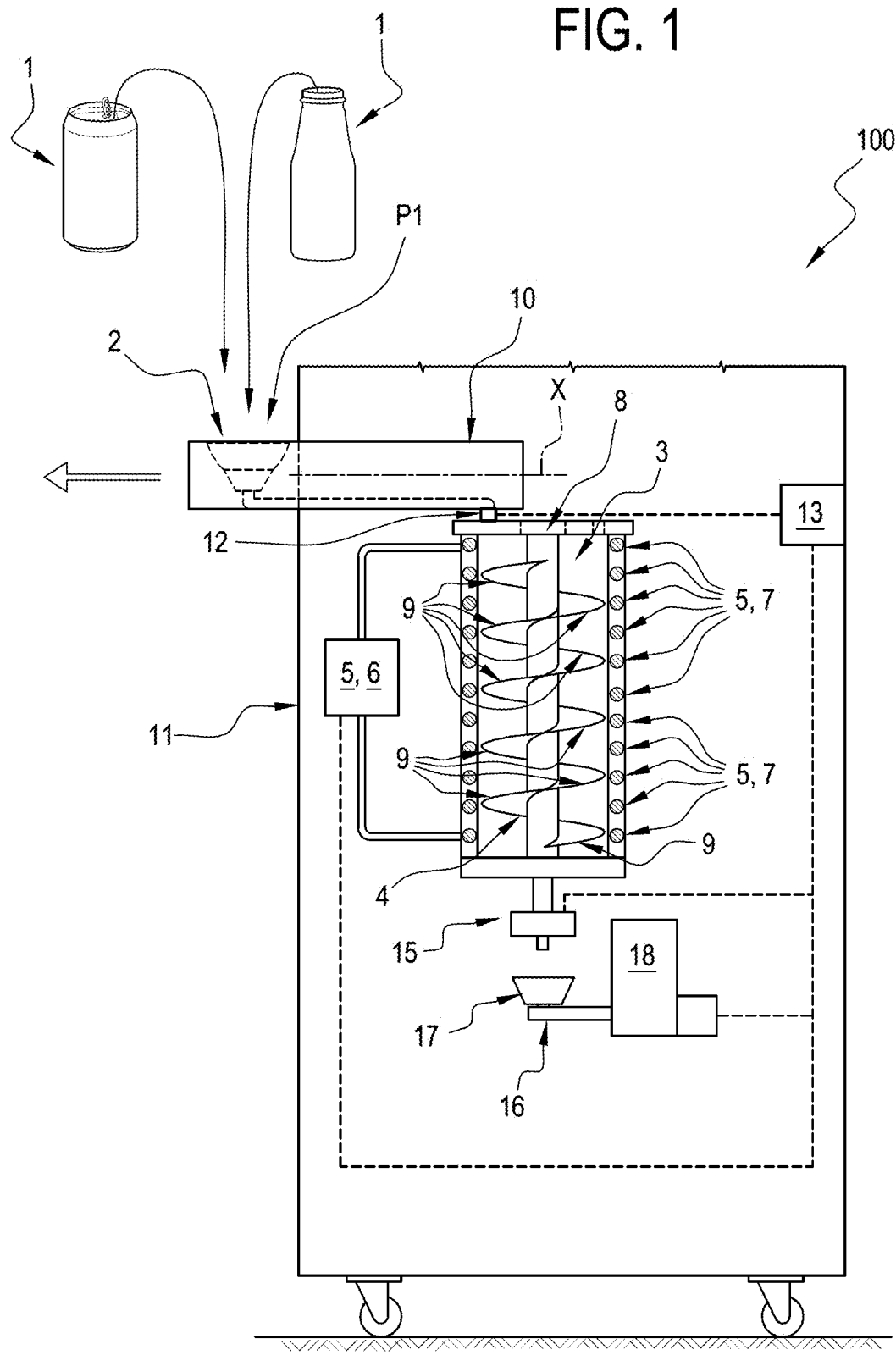
FIG. 1 schematically illustrates a first configuration of a first embodiment of the machine of this disclosure for making semiliquid products and adapted to implement the method of this disclosure.
Figure 2:
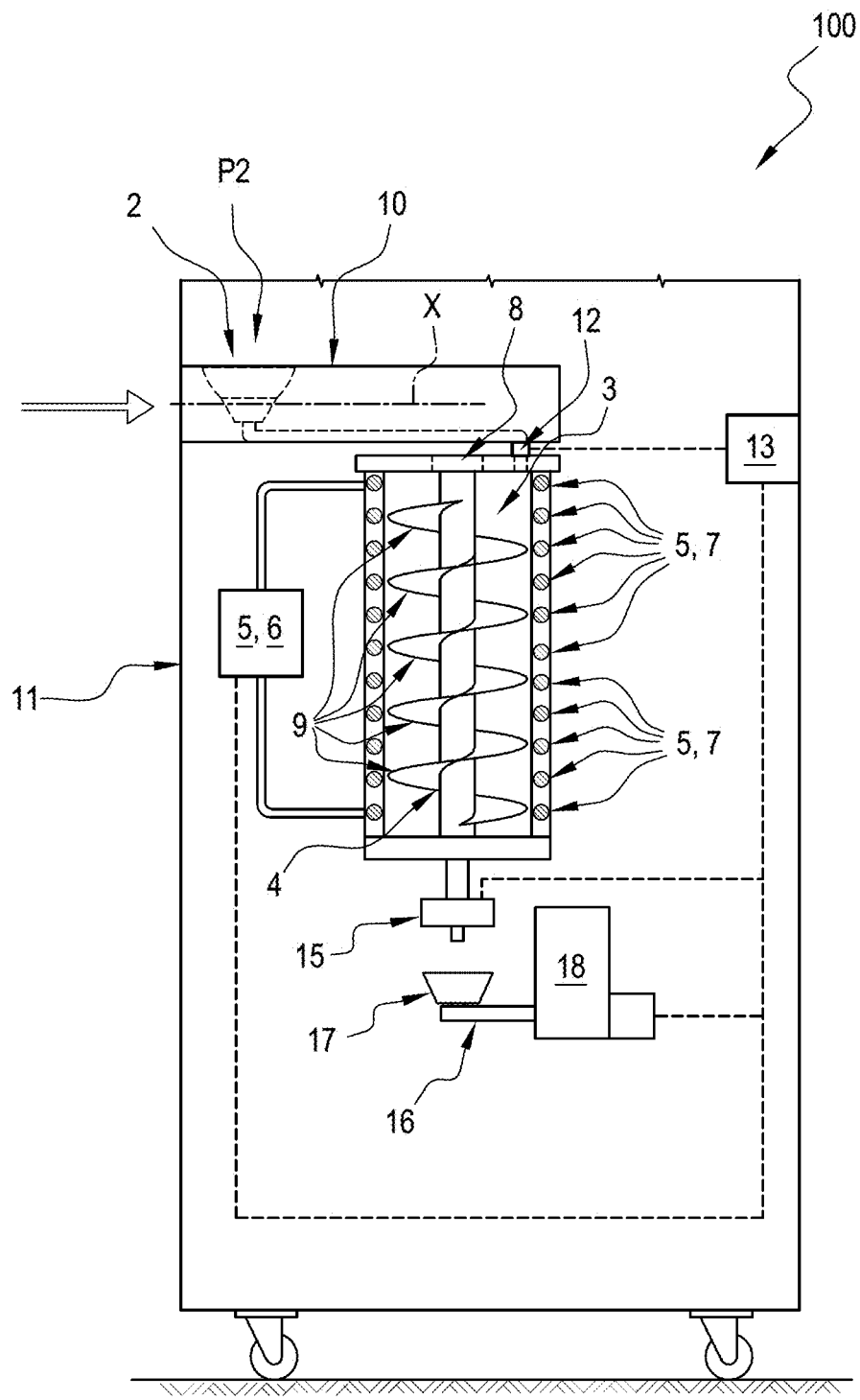
FIG. 2 schematically illustrates a second configuration of the machine of FIG. 1.
Figure 3:
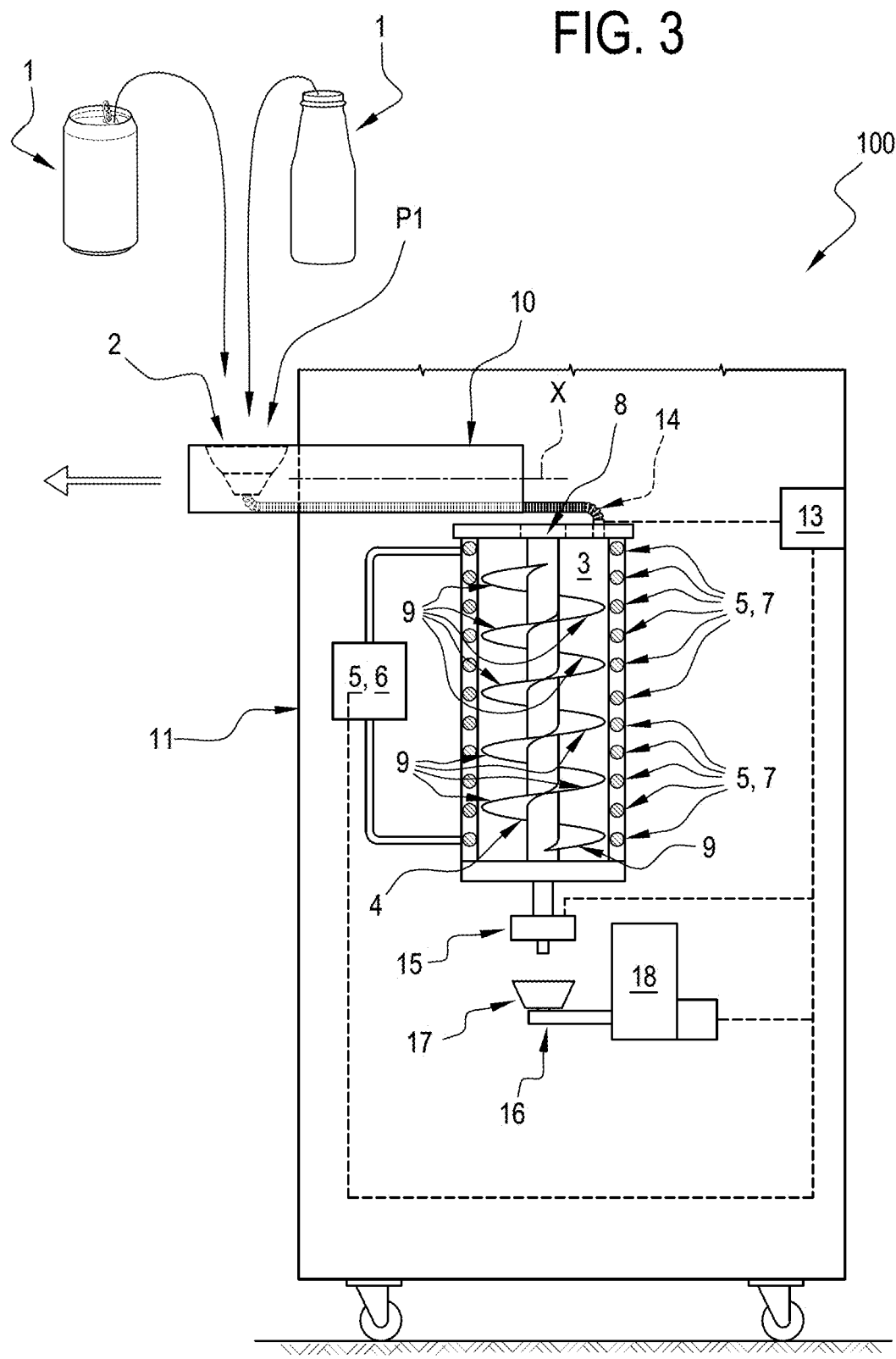
FIG. 3 schematically illustrates a second embodiment of the machine of this disclosure for making semiliquid products and adapted to implement the method of this disclosure.

With reference to FIGS. 1 to 3, the numeral 100 denotes a machine for making (semi-liquid) iced food products.

Preferably, by semi-liquid food products is meant products in a form whose consistency is between liquid and solid.

The products are iced: that is to say, subjected to a cooling process (preferably to temperatures below 0° C. and, still more preferably, to temperatures below 4° C.).

Preferably, the machine 100 is adapted to make finished products such as ice cream, yogurt, sorbet, coffee or cold confectionery creams.

According to the invention, the machine 100 for making semi-liquid iced food products, comprises:

a processing chamber 3 provided with a stirrer 4 and thermal treatment means 5;

a receptacle 2 for receiving a liquid base product from a container 1;

movement means for moving the receptacle 2 from a charging position P1 where it is filled with the liquid base product, which is contained in a container 1, to a discharging position P2 where it discharges the liquid base product.

The processing chamber 3 preferably has a cylindrical geometry.

According to one aspect, the processing chamber 3 has an axis of symmetry.

Preferably, the processing chamber 3 has a vertical axis of symmetry, as illustrated in the accompanying drawings).

In embodiments not illustrated, the processing chamber 3 has a horizontal axis of symmetry.

According to an aspect, the thermal treatment means 5 comprise a thermodynamic system adapted to run a thermodynamic cycle.

According to another aspect, the thermodynamic system comprises a compressor, a pressure reducing element, a first exchanger and a second exchanger 7 (associated with the processing chamber 3).

Preferably, the second exchanger 7, associated with the processing chamber 3, is defined by a coil wound around the walls of the chamber itself.

Preferably, the thermodynamic system preferably comprises a circuit containing a heat exchanger fluid.

Preferably, the circuit runs through the compressor, the pressure reducing element, the first exchanger and the second exchanger 7.

Preferably, the thermal treatment means 5 are configured to absorb heat through the walls of the processing chamber 3; that is to say, to absorb heat from the product being processed in the processing chamber 3.

Preferably, the machine 100 comprises an actuator 8, configured to set the stirrer 4 in rotation.

According to one aspect, the actuator 8 is an electric motor.

The stirrer 4 preferably comprises a plurality of radial blades 9 adapted to touch the inside wall of the processing chamber 3.

The radial blades 9 are configured to scrape the inside wall of the processing chamber 3 as the stirrer 4 rotates.

In an embodiment, illustrated in FIGS. 1 to 3, the receptacle 2 is formed in a drawer 10 which is movable relative to the frame 11 of the machine 100.

The drawer 10 is preferably movable between a charging position P1 and a discharging position P2 (preferably along a predetermined direction X).

At the charging position P1, the user pours the contents of the container 1 (that is, the liquid base product) into the receptacle 2.

In an embodiment, illustrated in FIGS. 1 and 2, the contents of the receptacle 2 are discharged into the processing chamber 3 (only) at the discharging position P2.

Preferably, in this embodiment, the machine 100 comprises a valve 12 which can be opened and closed to allow the contents of the receptacle 2 (the liquid base product) to be, respectively, discharged from and held within the receptacle 2.

Figure 4:
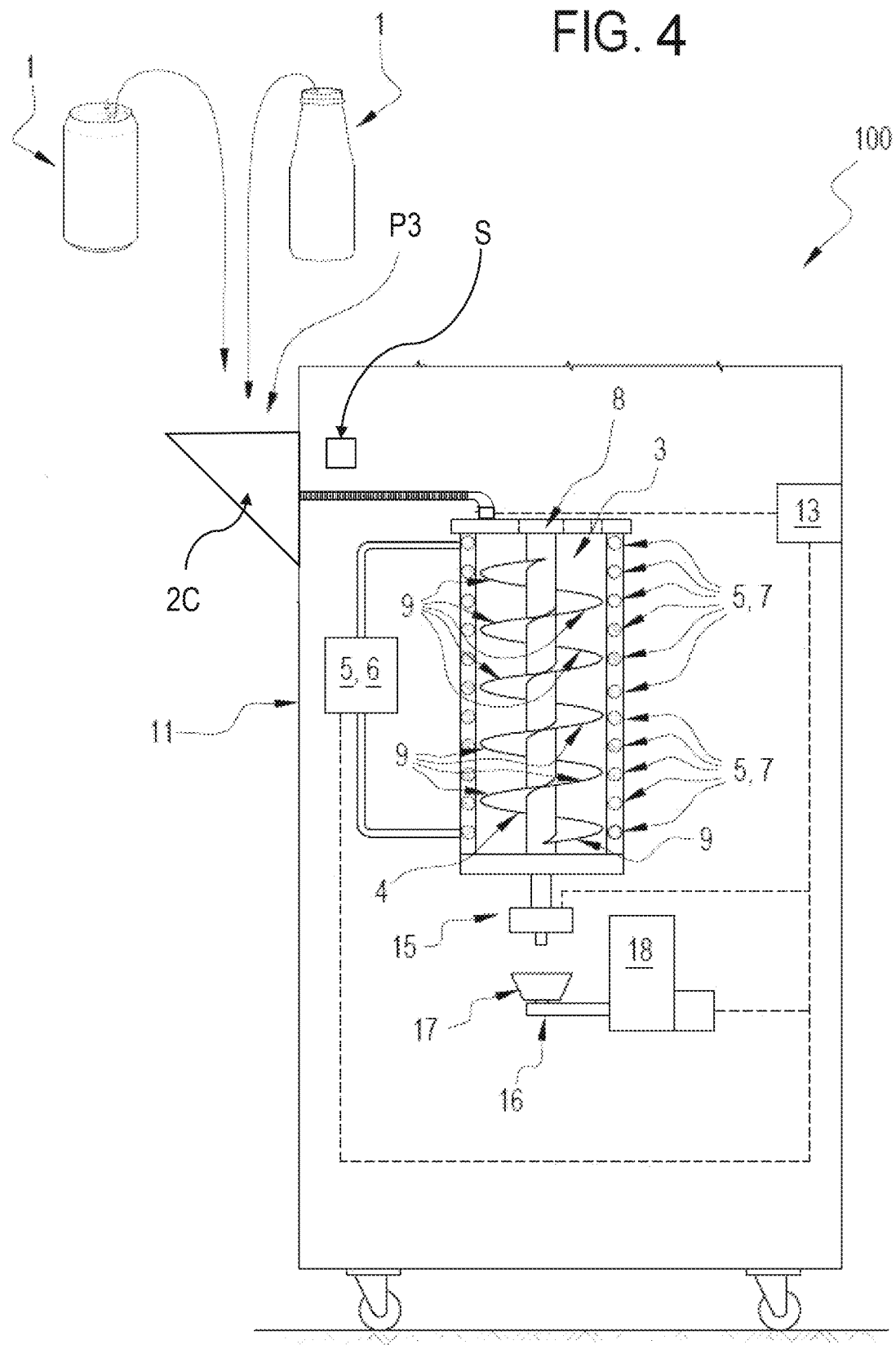
FIG. 4 schematically illustrates a first configuration of a third embodiment of the machine of this disclosure for making semiliquid products and adapted to implement the method of this disclosure.
Figure 5:
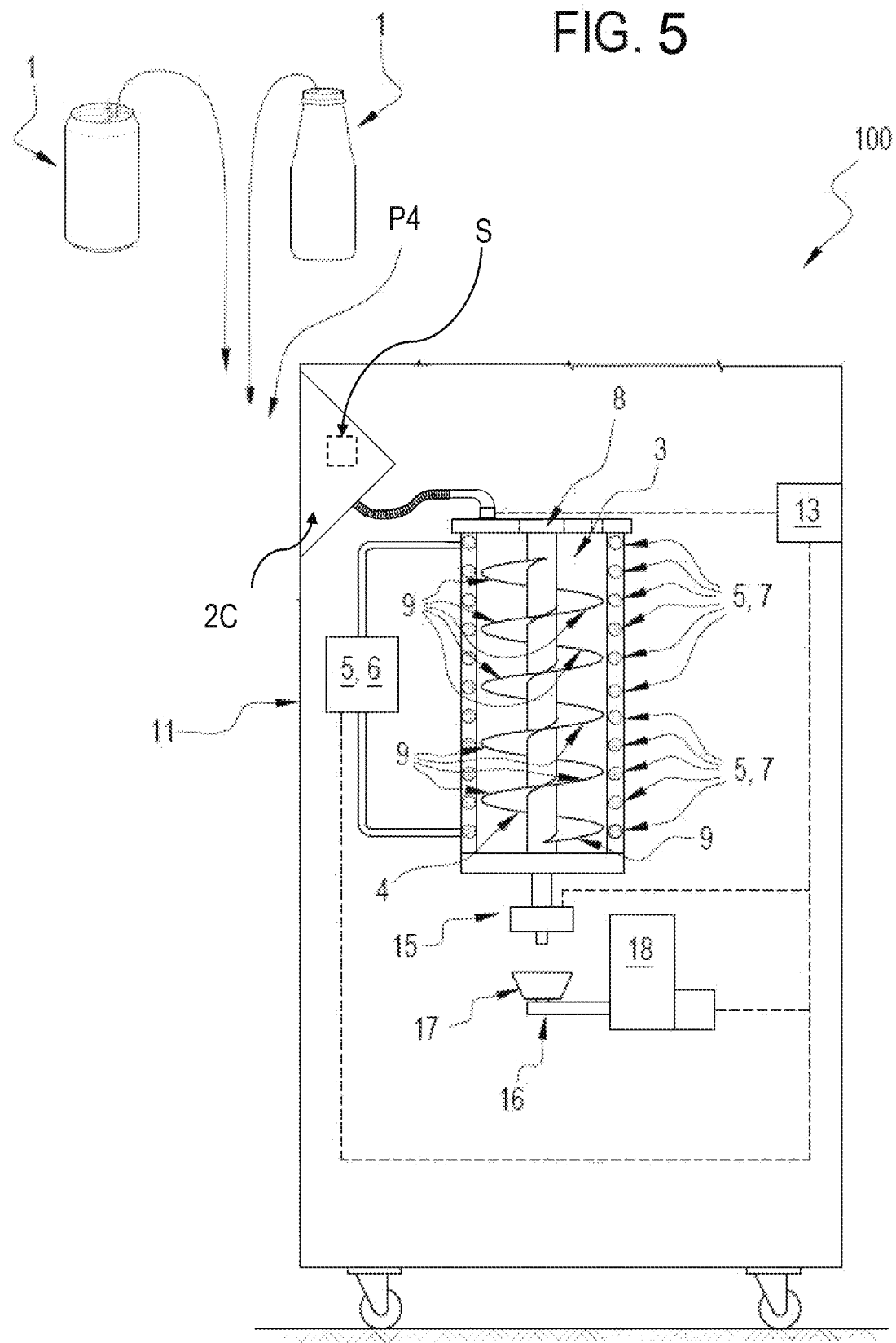
FIG. 5 schematically illustrates a second configuration of the machine of FIG. 4.
Figure 6:
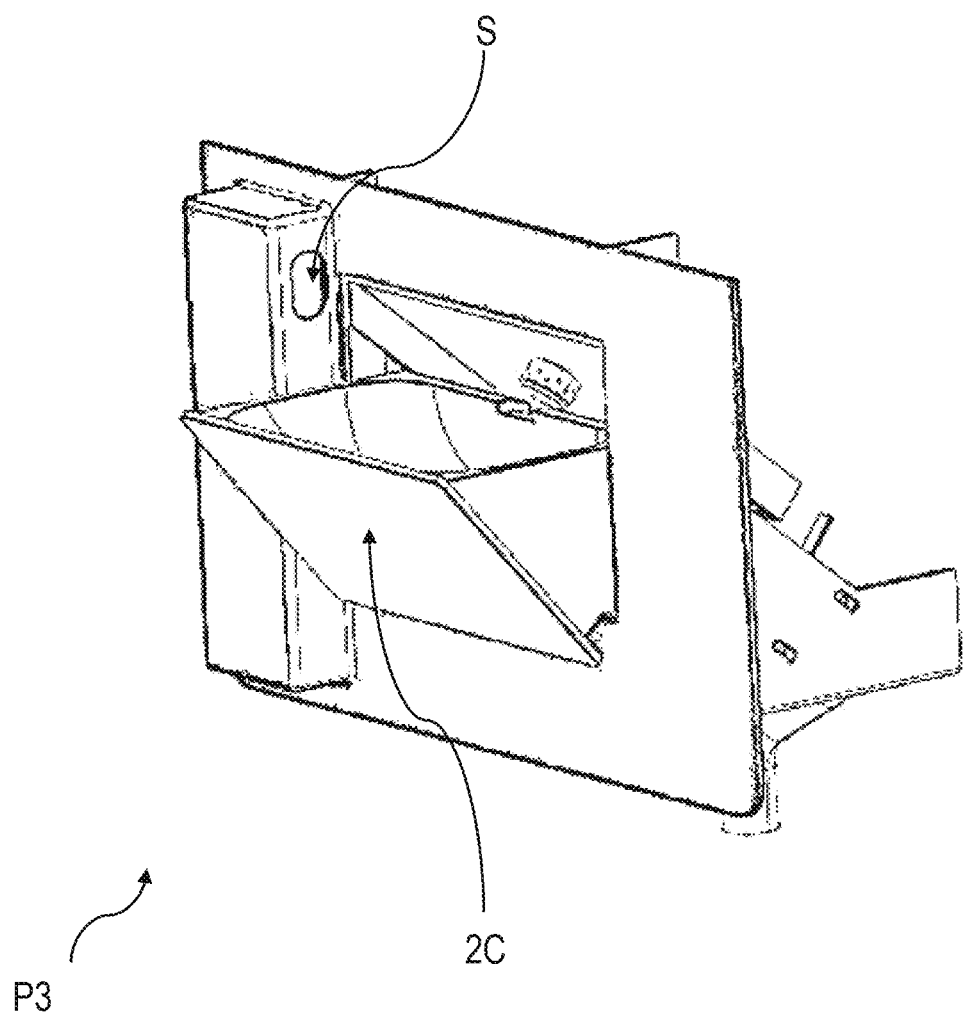
FIG. 6 illustrates a detail of the machine of FIG. 4 in a perspective view.

In another embodiment, illustrated in FIGS. 4 and 5, the receiving receptacle 2 is structured like a feed hopper 2C which rotates about an axis of rotation Y between a charging position P3 and a discharging position P4.

Preferably, in this embodiment, the receptacle 2 is in communication with the processing chamber 3 (for example by means of a pipe) at least at the discharging position P4 to release its contents (the liquid base product), which had previously been poured into the receptacle 2 itself.

Preferably, at the charging position P3, the receptacle 2 and the processing chamber 3 do not communicate, so as to allow the liquid base product poured into the receptacle 2 to be held therein.

According to another aspect, the machine 100 comprises an (electronic) drive and control unit 13.

Preferably, according to another aspect, the machine 100 comprises a sensor S (of any kind but preferably an optical sensor) configured to detect the position of the receptacle 2.

Preferably, the sensor S is operatively connected to the (electronic) drive and control unit 13. According to this aspect, the drive and control unit 13 instructs the valve 12 to open/close to allow the contents of the receptacle 2 (the liquid base product) to be, respectively, discharged from and held within the receptacle 2.

According to a first aspect, the (electronic) drive and control unit 13 is operatively connected to the actuator 8 of the stirrer 4 to drive it.

According to a second aspect, the (electronic) drive and control unit 13 is operatively connected to the valve 12 to instruct it to open/close.

According to a third aspect, the (electronic) drive and control unit 13 is operatively connected to the thermal treatment means 5 to control them (e.g. to switch them on or off or to regulate them).

In the embodiment illustrated in FIG. 3, the machine 100 comprises a pipe 14 which connects the receptacle 2 to the processing chamber 3.

Preferably, the pipe 14 is a flexible hose pipe or comprises a flexible portion.

According to another aspect, common to both of the embodiments, the machine 100 comprises a dispenser 15.

Preferably, the dispenser 15 is controlled (instructed to open/close) by the drive and control unit 13.

According to another aspect, common to both of the embodiments, the machine 100 comprises a support 16 for a container 17 of the finished iced food product.

Preferably, according to another aspect, the machine 100 comprises movement means 18 for moving the support 16.

According to another aspect, the (electronic) drive and control unit 13 is operatively connected to the movement means 18 for moving the support 16 to control them (e.g. to switch them on or off or to regulate them).

According to another aspect, the movement means 18 are configured to move the support 16 along a predetermined vertical direction.

According to another aspect, the movement means 18 are configured to rotate the support 16 about a vertical axis.

It should be noted that the (electronic) drive and control unit 13 is configured to drive the movement means 18 and the dispenser 15 in synchrony with each other.

Also defined according to the invention is a method for making semi-liquid iced food products.

It should be noted that the method is implemented by the machine 100 described above.

The method according to the invention comprises the following steps:

providing a container 1 containing a liquid base product;

opening the container 1 containing a liquid base product;

pouring only the contents of the container 1 into a receptacle 2;

transferring only the contents of the container 1, which have been poured into the receptacle 2, into a processing chamber 3 provided with a stirrer 4 and thermal treatment means 5;

cooling with the thermal treatment means 5 and simultaneously mixing with the stirrer 4, only the contents of the container 1 which have been transferred into the processing chamber 3 until obtaining a semi-liquid iced finished product (this step being also known as "batch freezing" the contents of the container 1).

The expression "only the contents of the container 1" is used to mean that no other liquids are added to the contents of the container 1. In a variant of the embodiment, however, sugar may be added.

Described below are further aspects of the method of the invention.

According to one aspect, the method comprises a step of reading a code (e.g. a QR code, a barcode) associated with (or applied on) the container 1 itself.

Preferably, the machine thus comprises a code reader to read the codes associated with container 1.

According to this aspect, one or more machine parameters are adjusted as a function of the code reading.

These one or more machine parameters may comprise, by way of non-limiting example, one or more of the following parameters: speed of the compressor of the thermal system, the time the thermal system is activated, the thermal power of the thermal system of the machine, the addition of sugars, if any, etc.

According to another aspect, the container 1 is a tin can.

According to another aspect, the container 1 is a brick carton.

According to a further aspect, the container 1 contains a fruit juice (e.g., a fruit extract).

According to another aspect of the method (implemented by the machine 100 illustrated in FIGS. 1 and 2), the step of transferring only the contents of the container 1 into the processing chamber 3 comprises a step of moving the receptacle 2 from a charging position P1 to a discharging position P2 where the contents of the container 1 are transferred from the receptacle 2 to the processing chamber 3.

According to another aspect of the method (implemented by the machine 100 illustrated in FIG. 3) the step of placing the receptacle 2 at a charging position P1 and transferring only the contents of the container 1 into the processing chamber 3 comprises a step of holding the receptacle 2 at the charging position P1.

It should be noted that according to another aspect, the step of transferring only the contents of the container 1 into the processing chamber 3 comprises a step of causing the contents to flow through a flexible hose pipe 14.

This advantageously allows the contents of the container 1 to be poured into the receptacle 2 and, irrespective of the position of the receptacle 2, transferring it substantially instantaneously into the processing chamber 3.

This aspect is illustrated in FIG. 3.

Described below are some aspects relating to the (volumetric) size of the receptacle 2, of the liquid poured into the receptacle 2, of the container 1 or of the processing chamber 3.

According to one aspect, the contents poured into the receptacle 2 are not greater than 500 mL in volume (preferably not greater than 350 mL).

According to one aspect, the contents poured into the receptacle 2 are not less than 150 mL in volume (preferably not less than 200 mL).

According to another aspect, the processing chamber 3 has an internal volume not greater than 1000 mL.

Preferably, the processing chamber 3 has an internal volume not greater than 800 mL.

Still more preferably, the processing chamber 3 has an internal volume not greater than 500 mL.

According to another aspect, the processing chamber 3 has an internal volume not less than 150 mL (preferably not less than 250 mL).

Moreover, it should be noted that thanks to the reduced size of the processing chamber 3, the machine 100 can make single portions of finished product in very short spaces of time (indeed, the contents for a single portion in a chamber of a size suitable for that single portion can be processed very quickly).

Preferably, the method of the invention and the machine 100 allow making a finished iced food product (for example, artisan gelato or soft ice cream, yogurt, sorbet, coffee, cold confectionery creams, etc.).

It should be noted that according to the method of the invention and, more specifically, using the machine 100, a finished (iced) product can be made from—that is, using only—the contents of one container 1.

This enables a user of the machine 100 to make a finished (iced) product directly from containers 1 purchased, for example, in the same shop where the machine itself is located.

Moreover, it should be noted that the machine 100 and method of the invention, allow making an innovative product not available to date.

It should be noted that the container 1 can contain any liquid product available on the market (for example, a beverage, a soft drink, a coffee, a fruit juice, a yogurt).

The method and the machine 100 of the invention therefore allow making a product whose quality and organoleptic and chemical properties cannot be found in products in existence to date.

What is claimed is:

1. A method for making semi-liquid iced food products, comprising the following steps:
    providing a container having a content of a liquid base product;
    opening the container containing the liquid base product;
    pouring only the content of the container into a receptacle;
    transferring only the content of the container, which has been poured into the receptacle, into a processing chamber provided with a stirrer;
    cooling the processing chamber and simultaneously mixing with the stirrer, only the content of the container which has been transferred into the processing chamber until obtaining a semi-liquid iced finished product;
    wherein the step of pouring only the content of the container into the receptacle comprises a step of placing the receptacle at a charging position; and
    wherein the step of transferring only the content of the container into the processing chamber comprises a step of holding the receptacle at the charging position.

2. The method according to claim 1, wherein the container is a tin can.

3. The method according to claim 1, wherein the container is a brick carton.

4. The method according to claim 1, wherein the liquid base product is a fruit juice.

5. The method according to claim 1, wherein the finished product is an ice cream, yogurt, sorbet, coffee or cold confectionery cream.

6. The method according to claim 1, wherein the content poured into the receptacle is not greater than 500 mL in volume.

7. The method according to claim 6, wherein the content poured into the receptacle is not greater than 350 mL in volume.

8. The method according to claim 6, wherein the content poured into the receptacle is not less than 150 mL and not greater than 500 mL in volume.

9. The method according to claim 8, wherein the content poured into the receptacle is not less than 200 mL and not greater than 500 mL in volume.

10. A machine for making semi-liquid iced food products, comprising:
    a processing chamber provided with a stirrer;
    a thermal treatment system comprising a thermodynamic system including a compressor, a pressure reducing element, a first exchanger and a second exchanger thermally connected to the processing chamber;
    a receptacle for receiving a liquid base product from a container;
    a movable drawer including the receptacle, wherein the movable drawer:
        is placed in a first position where the receptacle:
            is at an extended charging position and receives the liquid base product, which is poured from the container; and
            is flowingly connected to the processing chamber;
            is held in the first position while allowing the liquid base product poured into the receptacle to flow to the processing chamber; and
        is placed at a second position where the receptacle is retracted into the machine, after the liquid base product is poured.

11. The machine according to claim 10, wherein the processing chamber has an internal volume not greater than 1000 mL.

12. The machine according to claim 11, wherein the processing chamber has an internal volume not less than 150 mL.

13. The machine according to claim 11, wherein the processing chamber has an internal volume not less than 250 mL.

14. The machine according to claim 11, wherein the processing chamber has an internal volume not greater than 800 mL.

15. The machine according to claim 14, wherein the processing chamber has an internal volume not greater than 500 mL.

* * * * *